(12) United States Patent
Roys

(10) Patent No.: US 10,081,241 B2
(45) Date of Patent: Sep. 25, 2018

(54) DIESEL FUEL GUARD

(71) Applicant: Curtis Alan Roys, Fredericksburg, TX (US)

(72) Inventor: Curtis Alan Roys, Fredericksburg, TX (US)

(*) Notice: Subject to any disclaimer, the term of this patent is extended or adjusted under 35 U.S.C. 154(b) by 63 days.

(21) Appl. No.: 15/260,323

(22) Filed: Sep. 9, 2016

(65) Prior Publication Data
US 2017/0066643 A1    Mar. 9, 2017

Related U.S. Application Data

(60) Provisional application No. 62/265,786, filed on Dec. 10, 2015.

(51) Int. Cl.
*B65B 1/04* (2006.01)
*B60K 15/00* (2006.01)

(52) U.S. Cl.
CPC .................................. *B60K 15/00* (2013.01)

(58) Field of Classification Search
CPC . B60K 15/00; B60K 15/04; B60K 2015/0483
USPC ....................................................... 141/350
See application file for complete search history.

(56) References Cited

U.S. PATENT DOCUMENTS

| 2,520,935 | A | 9/1950 | Hubbell |
| D208,539 | S | 9/1967 | Miller |
| 3,911,977 | A | 10/1975 | Jean-Marie |
| 4,195,673 | A | 4/1980 | Johnston et al. |
| 5,156,198 | A | 10/1992 | Hall |
| 5,249,612 | A | 10/1993 | Parks et al. |
| 5,605,182 | A | 2/1997 | Oberrecht et al. |
| 5,857,501 | A | 1/1999 | Kelerich et al. |
| 6,116,298 | A | 9/2000 | Haimovich et al. |
| 6,274,106 | B1 | 8/2001 | Held |
| 6,302,169 | B1 | 10/2001 | Pulos |
| 6,329,022 | B1 | 12/2001 | Schlegel et al. |
| 6,374,868 | B1 | 4/2002 | Channing |

(Continued)

FOREIGN PATENT DOCUMENTS

| DE | 19639825 A1 | 4/1997 |
| DE | 19652729 A1 | 7/1997 |

(Continued)

OTHER PUBLICATIONS

PCT International Search Report and Written Opinion for PCT Application No. PCT/US2016/066005 dated Mar. 27, 2017.

(Continued)

*Primary Examiner* — Jason K Niesz
(74) *Attorney, Agent, or Firm* — Scheinberg & Associates, P.C.; Michael O. Scheinberg

(57) ABSTRACT

A device is provided to prevent the accidental introduction of an incorrect liquid into a tank, such as the introduction of gasoline into the fuel system of a diesel fuel container. The device discriminates between nozzle diameters, allowing entrance of nozzle diameters at or greater than a predetermined minimum diameter while inhibiting entrance of nozzles having diameters less than the predetermined minimum diameter. A closure mechanism prevents access to a fuel container interior and a releasable locking mechanism responsive to nozzle diameters allows the closure mechanism to open and close to allow access to the fuel container interior.

6 Claims, 11 Drawing Sheets

(56) References Cited

U.S. PATENT DOCUMENTS

| | | | |
|---|---|---|---|
| 6,382,270 B1 | 5/2002 | Gzik | |
| 6,531,099 B1 | 3/2003 | Held | |
| 6,607,014 B2 | 8/2003 | Webb | |
| 6,648,033 B2 | 11/2003 | Gabbey et al. | |
| 6,712,102 B2 | 3/2004 | Zerangue | |
| 6,871,677 B2 | 3/2005 | Zerangue | |
| 6,923,226 B2 | 8/2005 | Bartlett | |
| 7,051,772 B2 | 5/2006 | Dillon | |
| 7,077,178 B2 | 7/2006 | Hedevang | |
| 7,464,736 B2 | 12/2008 | Jones et al. | |
| 7,621,303 B2 | 11/2009 | Buchgraber | |
| 7,644,740 B2 | 1/2010 | Benjey et al. | |
| 7,661,550 B2 | 2/2010 | Feichtinger | |
| 7,841,357 B2 | 11/2010 | Rankin | |
| D646,300 S | 10/2011 | Peng | |
| 8,191,588 B2 | 6/2012 | Hagano | |
| 8,539,993 B2 | 9/2013 | Hagano | |
| 8,678,049 B2 | 3/2014 | Roys et al. | |
| 8,714,214 B2 | 5/2014 | Cisternino | |
| 8,726,950 B2 | 5/2014 | Miller et al. | |
| 8,863,792 B2 | 10/2014 | Kataoka et al. | |
| 8,978,913 B2 | 3/2015 | Walser et al. | |
| 8,979,913 B2 | 3/2015 | Weir et al. | |
| 9,133,013 B2 | 9/2015 | Roys | |
| 9,415,995 B2 | 8/2016 | Roys | |
| 2001/0004450 A1 | 6/2001 | Held | |
| 2002/0020465 A1* | 2/2002 | Gzik | B60K 15/04 141/390 |
| 2006/0289084 A1 | 12/2006 | Groom et al. | |
| 2008/0041492 A1 | 2/2008 | Gabbey et al. | |
| 2008/0236685 A1 | 10/2008 | Nourdine et al. | |
| 2008/0302442 A1 | 12/2008 | Miceli | |
| 2009/0020182 A1 | 1/2009 | Groom et al. | |
| 2009/0050625 A1 | 2/2009 | Fowler | |
| 2009/0071570 A1 | 3/2009 | Ito et al. | |
| 2010/0006178 A1 | 1/2010 | Muth et al. | |
| 2010/0218849 A1 | 9/2010 | Hagano | |
| 2011/0132906 A1 | 6/2011 | Miller et al. | |
| 2011/0139779 A1 | 6/2011 | Muller | |
| 2011/0315682 A1 | 12/2011 | Tsiberidis | |
| 2012/0211489 A1 | 8/2012 | Walser et al. | |
| 2012/0279612 A1 | 11/2012 | Washio et al. | |
| 2012/0305127 A1 | 12/2012 | Roys et al. | |
| 2013/0001226 A1 | 1/2013 | Breuer et al. | |
| 2013/0025703 A1 | 1/2013 | Steadman | |
| 2013/0074987 A1 | 3/2013 | Breuer et al. | |
| 2013/0193140 A1 | 8/2013 | Hagano et al. | |
| 2013/0233445 A1 | 9/2013 | Pfohl | |
| 2013/0327768 A1 | 12/2013 | Kataoka et al. | |
| 2013/0341326 A1 | 12/2013 | Sasaki | |
| 2014/0067883 A1 | 3/2014 | Fujita | |
| 2014/0110405 A1 | 4/2014 | Breuer et al. | |
| 2014/0284329 A1 | 9/2014 | Frank et al. | |
| 2015/0069058 A1 | 3/2015 | Ryu et al. | |
| 2015/0293542 A1 | 10/2015 | Kim et al. | |
| 2016/0016462 A1 | 1/2016 | Krafzig | |
| 2016/0016784 A1 | 1/2016 | Roys | |
| 2016/0152133 A1 | 6/2016 | Hendler et al. | |
| 2017/0066643 A1 | 3/2017 | Roys | |

FOREIGN PATENT DOCUMENTS

| | | |
|---|---|---|
| DE | 19720893 A1 | 12/1997 |
| DE | 10051212 A1 | 7/2002 |
| DE | 10146063 A1 | 4/2003 |
| DE | 10342343 A1 | 6/2004 |
| DE | 102006018597 A1 | 10/2007 |
| DE | 102008014579 A1 | 6/2009 |
| DE | 102012001672 A1 | 8/2013 |
| DE | 102012009884 A1 | 11/2013 |
| DE | 102013222686 A1 | 5/2015 |
| EP | 1264726 A2 | 12/2002 |
| EP | 0976599 B1 | 10/2003 |
| EP | 1284212 B1 | 12/2003 |
| EP | 1419959 B1 | 6/2007 |
| EP | 1854653 A1 | 11/2007 |
| GB | 2435037 | 8/2007 |
| JP | 2008168748 A | 7/2008 |
| SI | 21998 | 3/2005 |
| WO | 2006087376 A1 | 8/2006 |
| WO | 2007013863 | 2/2007 |
| WO | 2008084815 A1 | 7/2008 |
| WO | 2011158202 A2 | 12/2011 |
| WO | 2014067883 A2 | 5/2014 |
| WO | 2015067631 A1 | 5/2015 |

OTHER PUBLICATIONS

Unknown, "BMW's Diesel Incorrect Fueling Protection System—standard across the EU and NA," Retrieved from the internet Apr. 21, 2015, http://www/cleanmpg.com/forums/showthread.php?p=182447, 1 page.

Unknown, "Scully Oil Delivery Systems—The Original and Ultimate Delivery Efficiency Equipment, Scully Signal Company," Retrieved from the Internet Jun. 20, 2014, www.nationalpetroleum.net/scully-catalog.pdf., 34 pages.

Unknown, Bulk Fueling Nozzles, Retrieved from the Internet Jun. 24, 2014, http://www.nationalpetroleum.net/fuel-truck-and-transport/id17.html., 15 pages.

* cited by examiner

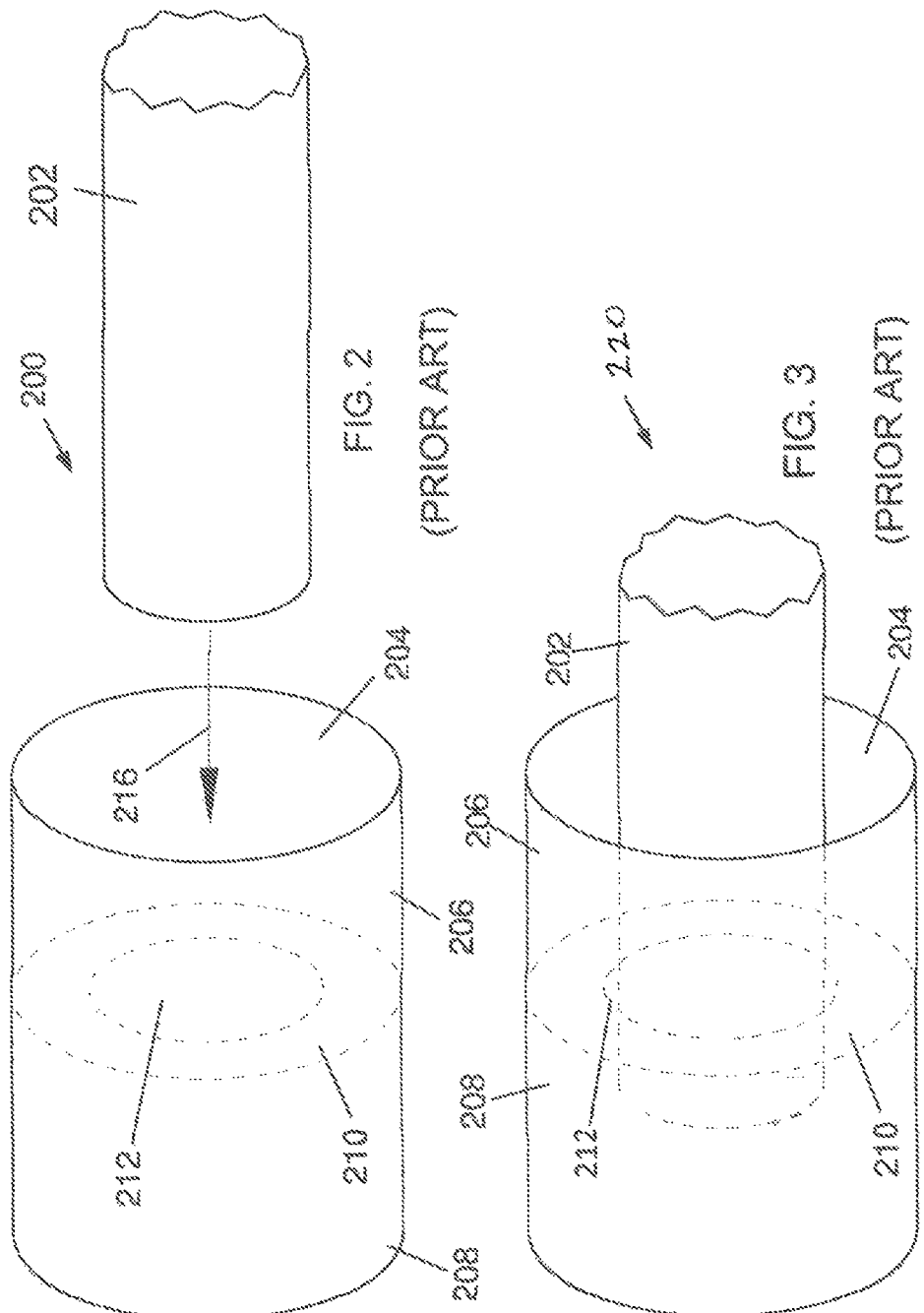

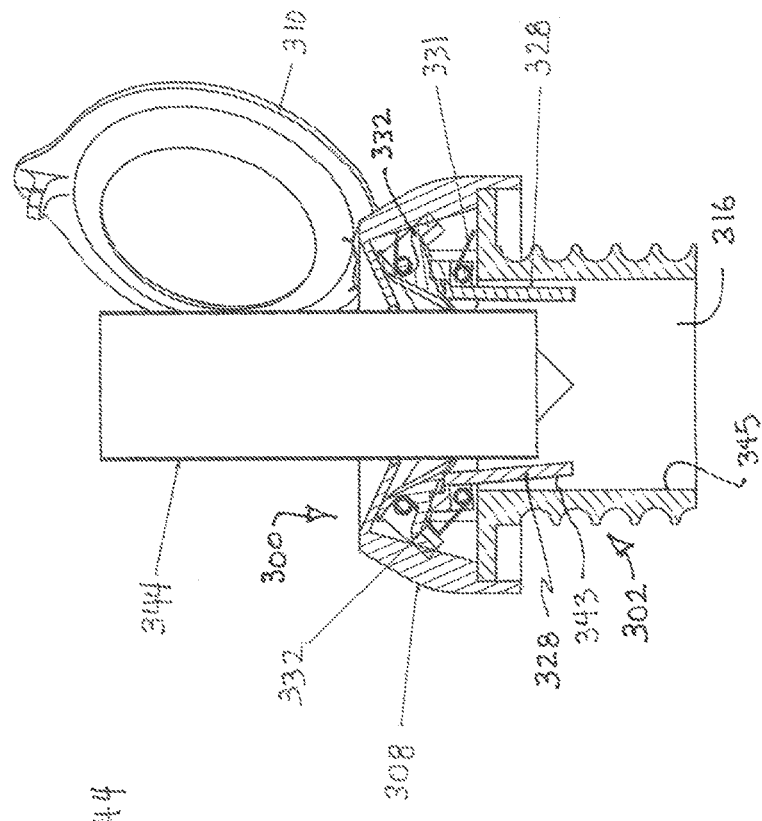
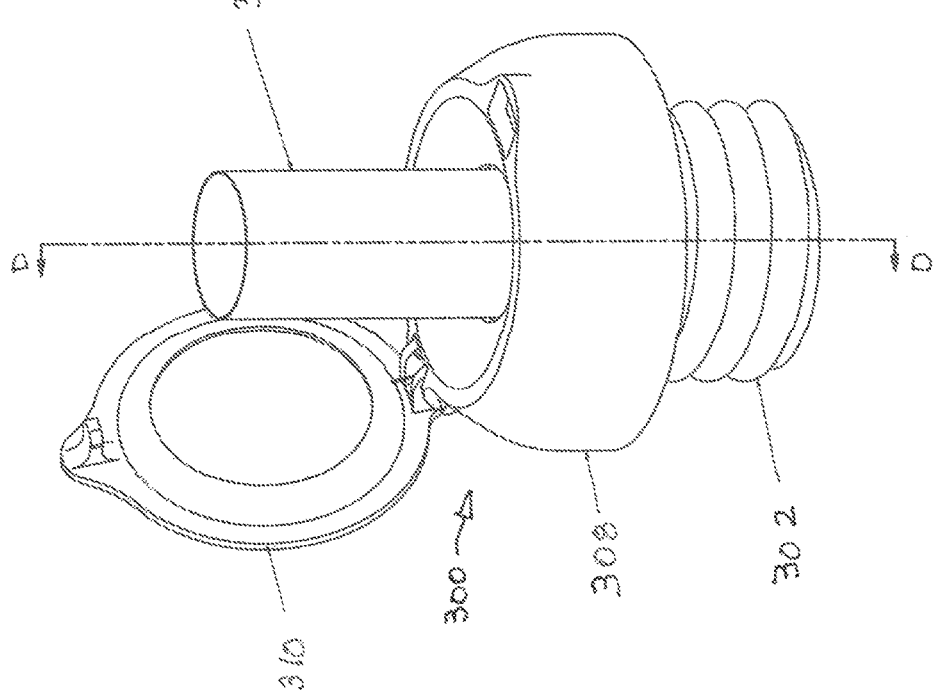
FIG. 17
FIG. 16

DIESEL FUEL GUARD

This application claims priority from U.S. Prov. Pat. App. No. 62/265,786, filed Dec. 10, 2015, entitled "Diesel Fuel Guard."

TECHNICAL FIELD OF THE INVENTION

The present invention relates to vehicles powered by internal combustion engines and in particular to a device for preventing incorrect fueling operations for diesel-powered vehicles.

BACKGROUND OF THE INVENTION

In the past few decades, government limits on the use of leaded fuels have led to the use of smaller gasoline fuel nozzles, designed to fit through "restrictors" in the fill tubes of gasoline-powered vehicles. These restrictors were designed to prevent the introduction of leaded gas into vehicles containing catalytic converters, which would be "poisoned" by the tetraethyl lead contained in older gasoline formulations. Another recent trend has been increasing use of diesel engines to power automobiles and other smaller vehicles, using low-sulfur diesel fuels. As a result, vehicles which an operator might have assumed to require gasoline in the past may now require diesel fuel instead, with correspondingly increased chances of incorrect fueling occurring.

Non-leaded gasoline fill nozzles are approximately 13/16 inch in outer diameter, with gasoline-powered vehicles being configured with restrictors in their gasoline fill tubes having openings corresponding to this size nozzle. Small vehicle diesel fill nozzles are slightly larger, approximately 15/16 inch in diameter, corresponding to the size of the older leaded gas fill nozzles. The restrictors in diesel-powered vehicles must then have openings correspondingly larger to accommodate this slightly larger size fill nozzle.

As a result, the restrictors in gasoline-powered vehicles have openings too small to allow insertion of low-sulfur #2 diesel fuel nozzles (as these nozzles have the same size as the old leaded fuel nozzles, the insertion of which the restrictor was designed to prevent). This situation generally minimizes the chance of accidentally introducing diesel fuel into a gasoline-powered vehicle. Unfortunately, the opposite error of accidentally introducing gasoline or diesel exhaust fluid (DEF) into a diesel-powered vehicle is not prevented by the restrictor mechanism, as the smaller gasoline fill nozzle fits easily through the larger opening in the diesel fill tube restrictor. In the past, when diesel power was generally employed only for larger trucks and very few smaller vehicles, this fueling error was less common. With the advent of modern diesel-powered smaller vehicles, such as those employing common-rail direct fuel injection, increasing numbers of smaller vehicles are diesel-powered with the result that fueling errors are now more common.

FIG. 1 shows a view 100 of a motor vehicle 106 having an internal combustion engine 104 and a fuel tank 116 connected to the internal combustion engine 104 by a fuel line 114. A fuel pump 102 supplies fuel to nozzle 112 through tube 110. Nozzle 112 is inserted through fill tube 108 to enable filling of fuel tank 116. Internal combustion engine 104 may be a gasoline engine, in which case fuel pump 102 should be configured to supply gasoline through tube 110 to fuel tank 116 to ensure proper operation of internal combustion engine 104. Alternatively, internal combustion engine 104 may be a diesel engine, in which case fuel pump 102 should be configured to supply diesel fuel through tube 110 to fuel tank 116 to ensure proper operation of the diesel engine. One possible incorrect fueling operation occurs if internal combustion engine 104 is a diesel engine and fuel pump 102 is configured to supply gasoline or DEF through tube 110 to nozzle 112. Another possible incorrect fueling operation occurs if internal combustion engine 104 is a gasoline engine and fuel pump 102 is configured to supply diesel fuel through tube 110 to nozzle 112. In either of these two incorrect fueling operations, internal combustion engine 104 would be supplied by the wrong type of fuel through fuel line 114 leading from fuel tank 116, which in both scenarios would contain the wrong type of fuel or fluid (i.e., gasoline or DEF for the diesel engine, or diesel fuel for the gasoline engine). As described above, diesel fill nozzles are generally configured to be too large in diameter to allow the filling of gasoline fuel tanks with diesel fuel, as the nozzle will not fit through the restrictor hole. Conversely, gasoline fill nozzles are small enough in diameter to easily fit into the fill tubes of diesel-powered vehicles.

FIGS. 2 and 3 show before and after positions of a diesel nozzle entering a diesel fuel tube in the prior art. FIG. 2 shows a before position 200 of a diesel nozzle 202 entering a diesel fill tube 204 along directional arrow 216. Diesel fill tube 204 includes an outer tube 206 and inner tube 208, where outer tube 206 and inner tube 208 are separated by a restrictor 210 with entrance hole 212 configured to fit closely around the outer diameter of diesel nozzle 202. FIG. 3 shows an after position 220 of the diesel nozzle 202 of FIG. 2 fitting closely into entrance hole 212 and into the inner tube 208. In this configuration, diesel nozzle 202 is positioned to supply diesel fuel to the diesel fuel tank (not shown) attached to inner tube 208. FIG. 3 illustrates a correct fueling configuration in which the proper type of fuel (i.e., diesel fuel) may be introduced to a diesel-powered vehicle.

FIGS. 4 and 5 show before and after positions of a gasoline or DEF nozzle entering a diesel fuel tube in the prior art. FIG. 4 shows a before position 230 of a gasoline or DEF nozzle 232 entering the diesel fill tube 204 of FIGS. 2 and 3 along directional arrow 234. Such nozzles typically have outer diameters of approximately 13/16 inch (approximately 21 mm), while typical #2 low-sulfur diesel nozzles have outer diameters of approximately 15/16 inch (approximately 24 mm). FIG. 5 shows an after position 240 of the gasoline or DEF nozzle 232 of FIG. 4 fitting loosely into the diesel fill tube 204 of FIGS. 2 and 3. A portion 242 of gasoline or DEF nozzle 232 is shown protruding through entrance hole 212 and into the inner tube 208. In this configuration, gasoline or DEF nozzle 232 is positioned to supply gasoline or DEF to the diesel fuel tank (not shown) attached to inner tube 208.

FIG. 5 illustrates an incorrect fueling configuration in which the wrong type of fuel or fluid (e.g., gasoline or DEF) may be introduced to a diesel-powered vehicle. Note that in the prior art there is no physical bar to the insertion of a gasoline or DEF nozzle into the diesel fuel tube, thus the incorrect fueling operation illustrated in FIGS. 4 and 5 is possible, and indeed, commonly occurs accidentally. As discussed above, the consequences of supplying gasoline or DEF to a diesel internal combustion engine may include serious damage to internal components of the diesel engine arising from premature explosion of the gasoline within the engine cylinders (due to the higher compression ratios compared with gasoline engines), as well as a lack of natural lubrication for engine components (diesel fuel oil is a lubricant, while gasoline is not).

Various devices are known to prevent improper dispensing of fuel into the wrong container. For example, U.S. Pat. No. 7,661,550, issued to Feichtinger, discloses a filler neck of a fuel tank with an arrangement of mechanical tubes, latches, locks, and springs that allow only the correct fuel nozzle to be inserted to dispense fuel. This device discriminates between smaller and larger nozzle sizes so that only a larger nozzle for dispensing diesel fuel can be inserted and a smaller gasoline nozzle is prevented from being inserted. Other examples of mechanical methods include U.S. Pat. No. 8,863,792, issued Kataoka et al, for a filling port structure for a fuel tank, U.S. Pat. No. 8,726,950, issued to Miller et al, for a mis-fuel inhibitor, U.S. Pat. No. 8,978,913, issued to Walser et al, for a filler neck for the fuel tank of a motor vehicle with selective opening, and Printed Publication No. US 2011/0315682, to Tsiberidis, published on Dec. 29, 2011. Other prior art devices utilize electronic components to prevent improper fueling. For example, U.S. Pat. No. 8,678,049, issued to Roys et al, and U.S. Pat. No. 9,133,013, issued to Roys, both disclose indicators that alert an operator of an attempted improper fueling.

Although prior art devices are known to prevent improper dispensing of fuel, such devices are overly complex, and require modification of fuel pumps or fuel tanks. Further, such complex arrangements complicate assembly, installation or retrofitting on existing systems. This makes wide spread adoption of these solutions difficult, requiring great expense. Gas stations are hesitant to modify pumps before a significant number of automobile filler tanks are modified to work with the new nozzles, and automobile manufacturers are hesitant to modify the fuel tanks until a significant number of gas stations have modified nozzles.

The problem of putting the wrong fuel or fluid in a tank is not limited to a consumer filling a tank of an automobile, but can extend to workers filling fuel trucks with an incorrect fuel, or a fuel truck operator putting an incorrect fuel into an underground tank at a gas station or into an above-ground commercial or agricultural tank. For example, a worker could put gasoline in the diesel tanker truck or diesel in the gasoline tanker truck or diesel in the gasoline tanker truck. The incorrect fuel could be put into the ground holding tanks at the gas station or convenience store. As a result, hundreds of vehicles would be affected because the owner/operator of the gas pumps doesn't recognize the wrong fuel has been put in his underground storage tanks until a customer has problems and complains.

What is needed is a device capable for use with current fuel tanks to prevent improper fueling without complicated mechanics, modification or expensive electronics.

SUMMARY OF THE INVENTION

An object of the present invention is to provide a method and device to prevent incorrect fueling operations, such as putting gasoline or DEF into a diesel-powered vehicle.

A device is provided to prevent the accidental introduction of an incorrect liquid into a fuel container. The device discriminates between nozzle diameters, allowing entrance of nozzle diameters at or greater than a predetermined minimum diameter while inhibiting entrance of nozzles having diameters less than the predetermined minimum diameter. The device may comprise a fuel cap assembly that can easily replace current fuel caps or covers, or the device can be permanently mounted to an opening, such as a fuel filler neck, of a fuel container, such as a fuel tank.

Upon insertion of a nozzle of the appropriate diameter, locking elements are displaced, which allow the nozzle to then displaced pivoting members and enter the container opening.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which:

FIG. 2 is a schematic isometric view of a prior art diesel nozzle entering a diesel fill tube in the prior art;

FIG. 3 is a schematic isometric view of the diesel nozzle of FIG. 2 fitting closely into a diesel fill tube;

FIG. 16 is a perspective view of the fuel cap assembly with a nozzle fully inserted;

FIG. 17 is a sectional view taken along line D-D of FIG. 16;

DETAILED DESCRIPTION OF PREFERRED EMBODIMENTS

Figure 1:
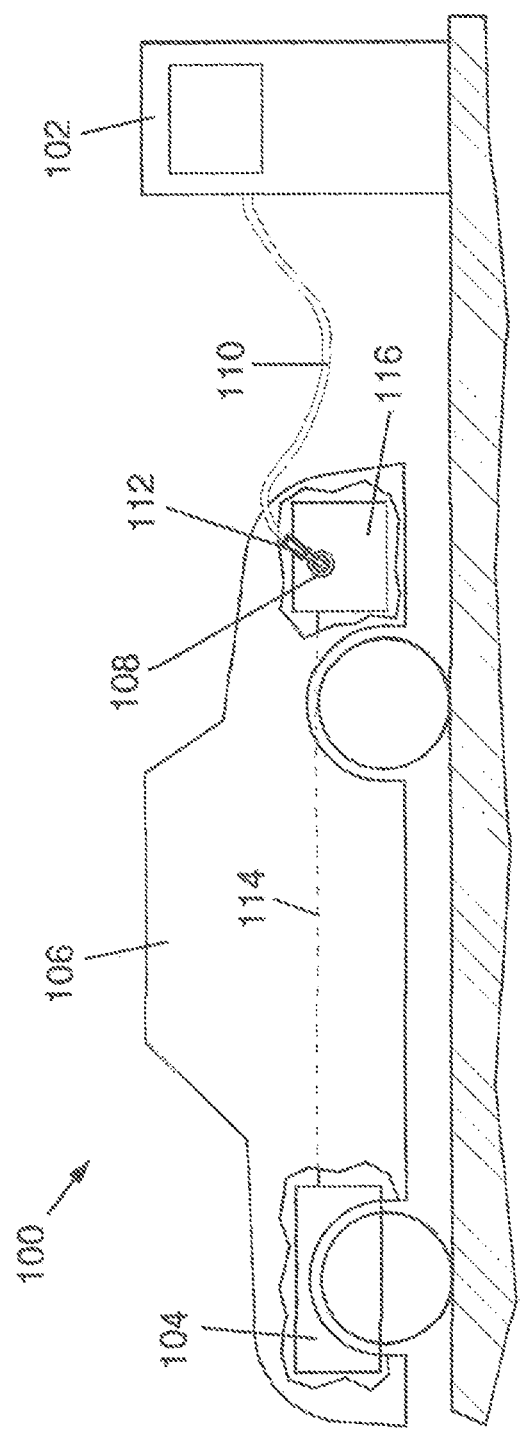
FIG. 1 is a schematic view of a prior art motor vehicle having an internal combustion engine and a fuel tank connected to the internal combustion engine.
Figure 4:
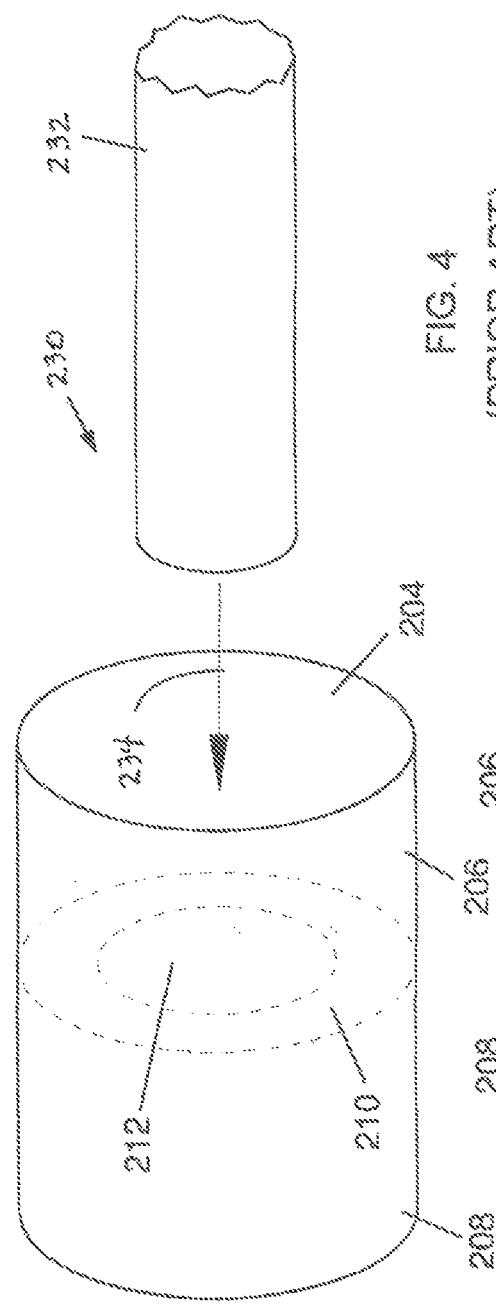
FIG. 4 is a schematic isometric view of a prior art gasoline nozzle entering a diesel fill tube.
Figure 5:
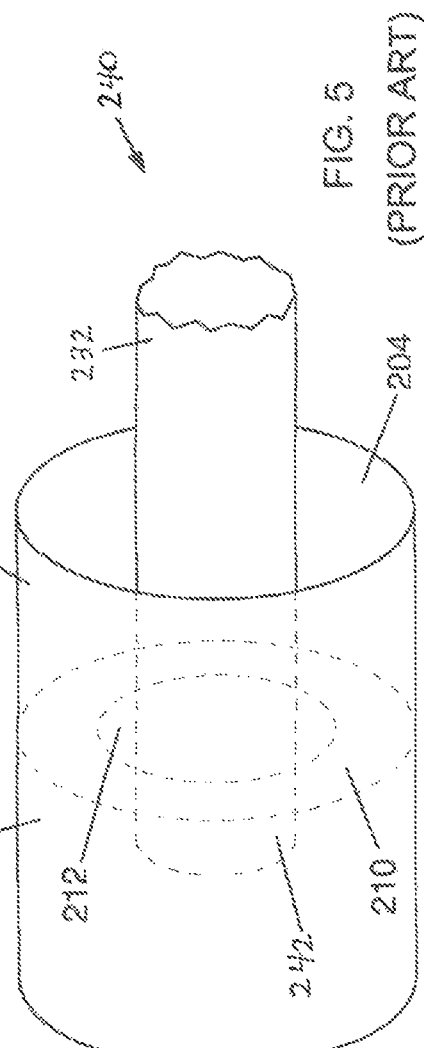
FIG. 5 is a schematic isometric view of the gasoline nozzle of FIG. 4 fitting loosely in a diesel fill tube.
Figure 6:
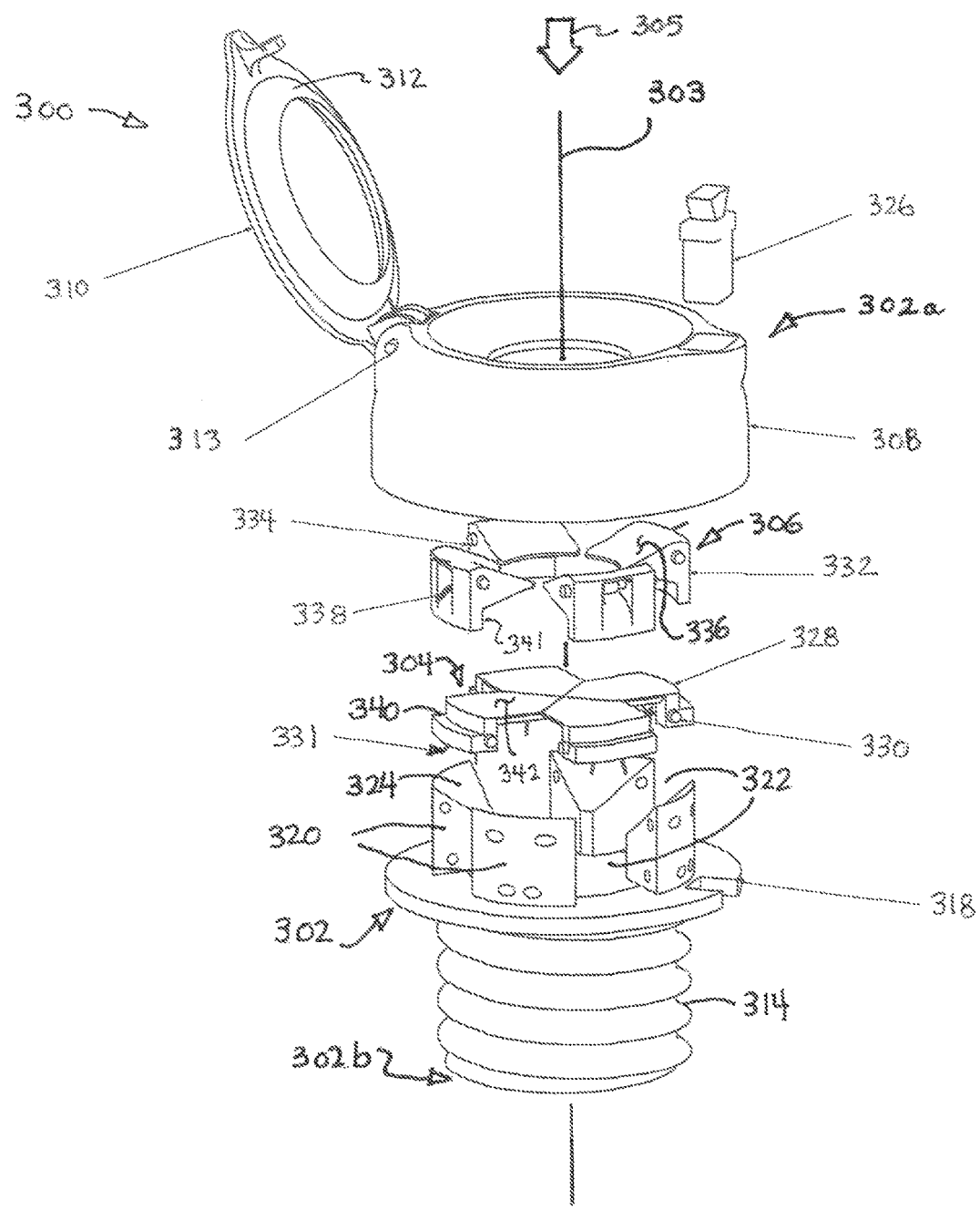
FIG. 6 is an exploded view of the fuel cap assembly according to the invention.
Figure 7:
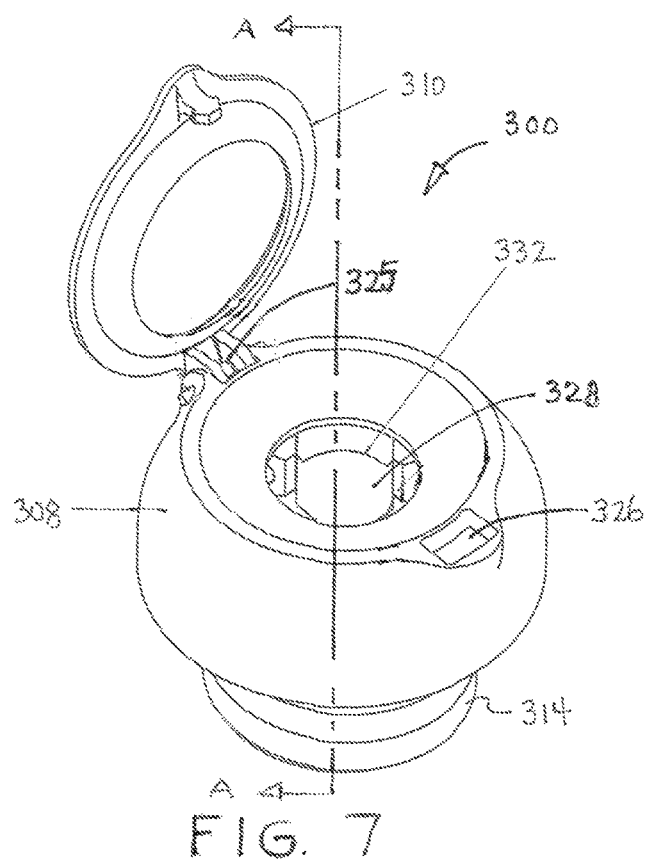
FIG. 7 is a perspective view that illustrates the fuel cap assembly in an open position.
Figure 8:
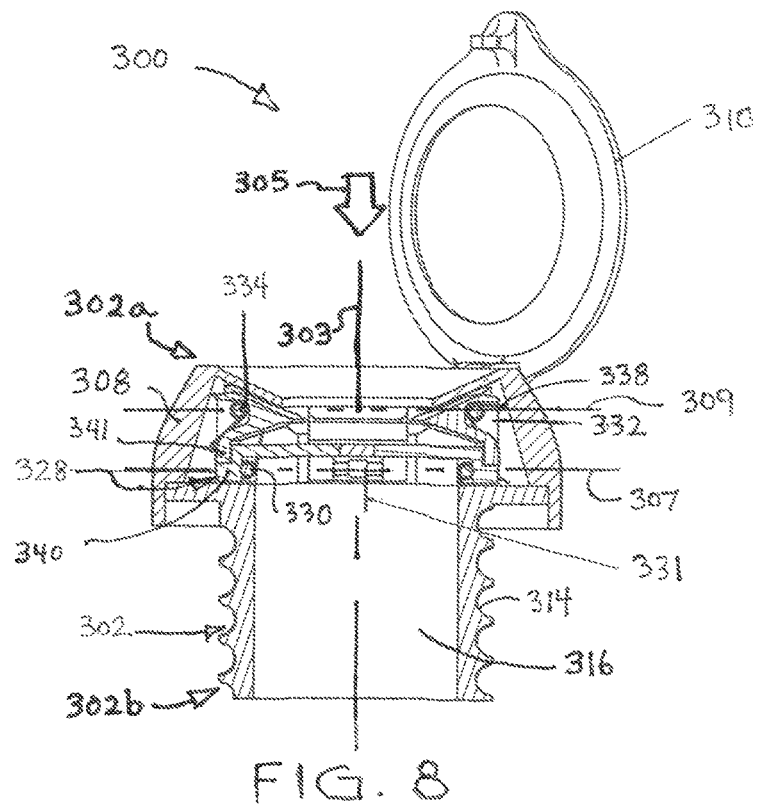
FIG. 8 is a sectional view taken along line A-A of FIG. 7.

Embodiments of the invention provide an apparatus for preventing incorrect fueling operations for diesel-powered vehicles and diesel storage containers. As seen in FIGS. 6-8, the apparatus is shown as a removable fuel cap assembly 300 for a fuel container such as a vehicle gas tank or a fuel storage container. As used herein, the term "fuel container" is used to mean any container in which fuel is kept, including vehicle fuel tanks and stationary tank. The term includes both the portion of the container in which fuel is stored, and the portion of the container, such as a filler neck, through which fuel is supplied to the container. Fuel cap assembly 300 is constructed as a replaceable fuel cap for an existing vehicle gas tank or fuel storage container. The apparatus prevents insertion of a fuel nozzle that is smaller in diameter than the nozzles provided for the intended fuel. Although the apparatus is shown and described as a removable and replaceable fuel cap assembly 300, the apparatus can also be incorporated into an inlet filler neck of a vehicle fuel system with an outer cap. The fuel cap assembly 300 shown and described is only one suitable arrangement in which the apparatus can be used, but is not intended to limit applications and uses of the present invention, nor the scope of the claims that follow.

Fuel cap assembly 300 includes a body 302 configured to be connected to a filler neck or other opening of a fuel container (not shown), a closure mechanism 304 movable from a closed position that blocks access of the nozzle into the fuel container to an open position to allow access into the fuel container through body 302, and a locking mechanism 306 to releasably lock closure mechanism 304 in a closed position. Together closure mechanism 304 and locking mechanism 306 make up a nozzle discriminating mechanism. A nozzle guide 308 ensures that a fuel nozzle is not inserted at an angle to accidentally release closure mechanism 304. A cover 310 with a seal 312 is pivoted about pin 313 to close fuel cap assembly 300. Cover 310 can be opened to provide access to the interior of body 302 (FIGS. 7 and 8) and held in the open position by a spring 325 (FIG. 7) or closed and held in place with a catch 326 to protect the body interior from the outside elements. Although body 302 is shown with screw threads 314 for attachment to the neck of a fuel container, fuel cap assembly 300 may be attached using any number of attachments, such as a bayonet lock, snap-on connection, or another preferred attachment.

Body 302 and nozzle guide 308 provide a housing to contain closure mechanism 304 and locking mechanism 306. Body 302 extends along a longitudinal axis 303 (FIGS. 6 and 8) from a first end 302a forming a fuel inlet to a second end 302b forming a fuel outlet. A through-opening 316 (FIG. 8) extends through body 302 from first end 302a to second end 302b defining a fuel flow path 305 into which a fuel nozzle of sufficient diameter can be inserted to dispense fuel into a container. Closure mechanism 304 is positioned adjacent locking mechanism 306 on a side facing second end 302b. Body 302 includes a platform 318 and spaced longitudinally extending protrusions 320 forming gaps 322 between each protrusion 320. Each protrusion 320 has a top surface 324 with a triangular shape that slopes toward the center of body 302. Outer circumferential screw threads 314 are provided at second end 302b of body 302 for connection to the fuel container.

Closure mechanism 304 is formed of multiple segments or pivotal elements 328 mounted circumferentially about the perimeter of through-opening 316. Pivotal elements 328 extend radially inward toward the center of body 302 to block through-opening 316 when in the closed position. Each pivotal element 328 is located within a gap 322 and is pivotally connected to associated protrusions 320 by a pivot pin 330 and biased to the closed position by spring 331. Pivotal elements 328 pivot from a closed position to an open position about pivot pins 330 each of which forms an axis extending perpendicular to longitudinal axis 303 and positioned in a plane 307 (FIG. 8).

Locking mechanism 306 is formed of multiple locking elements 332 extending radially inwardly. Each locking element 332 is located within a gap 322 and is pivotally connected to associated protrusions 320 by a pivot pin 334 to pivot from a locked position to an unlocked position. Each pivot pin 334 defines an axis extending perpendicular to longitudinal axis 303 and positioned in a plane (FIG. 8). Plane 309 is parallel to plane 307 and positioned nearer the fuel inlet than plane 307. Pivot pins 334 about which each locking element 332 pivots are spaced along longitudinal axis from pivot pins 330 about which each pivotal element 328 pivots in a direction toward second end 302a of body 302. Pivot pin 334 of each locking element is in the same plane as the pivot pin 330 of the corresponding pivotal element, each of the planes being parallel to longitudinal axis 303. Locking elements 332 include a radially extending upstream-facing surface 336 that slopes inwardly toward the center of body 302 and are biased to a locking position by a spring 338. Pivotal elements 328 and locking elements 332 are arranged within gaps 322 so that each locking element 332 is associated with an adjacent pivotal element 328 to block its associated pivotal element 328 from pivoting to an open position. Each locking element 332 is positioned adjacent its associated pivotal element 328 at a side facing first end 302a of body 302. Surfaces 336 of locking elements 332 form an engagement surface for a nozzle of sufficient diameter so that, when engaged by the nozzle, a force is applied to locking elements 332 causing them to pivot to an unlocking position to release pivotal elements 328.

Figure 11:
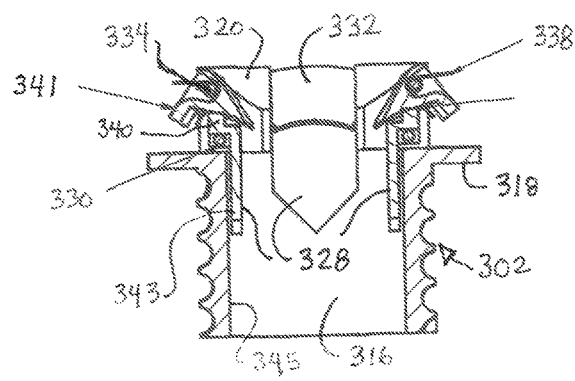
FIG. 11 is a sectional view of the body assembly taken along line B-B of FIG. 12.

Each pivotal element 328 includes an extension with a flange 340 that extends radially outwardly when in the closed position. Each locking element 332 includes a lip 341 positioned in an abutting relationship with a flange 340 of an associated pivotal element 328 in the closed position to hold or lock pivotal element 328 in the closed position and prevent it from pivoting to an open position. When a nozzle of sufficient diameter engages surfaces 336 of locking elements 332 a downstream directed force is applied and locking elements 332 pivot about pivot pins 334 to a first insertion point so that lip 341 disengages its associated flange 340 and is no longer in an abutting relationship therewith. As the nozzle is further inserted to a second insertion point, a further force is applied by the nozzle causing locking elements 332 to engage upper surfaces 342 of associated pivotal elements 328 causing them to pivot about pivot pins 330 inside flow path 305 and toward second end 302a of body 302 into an open position. Further insertion of the nozzle causes pivotal elements 328 to pivot to a fully open position to allow passage of the nozzle into through-opening 316 and establish a path between fluid inlet at first end 302a of body 302 and fluid outlet at second end 302b of body 302. In the fully open position, each pivotal element 328 is pivoted about 90° from the closed position so that a surface 343 facing second end 302b of body 302 in the closed position is substantially parallel with an inner surface 345 of body 302 (FIGS. 11 and 17).

Figure 9:
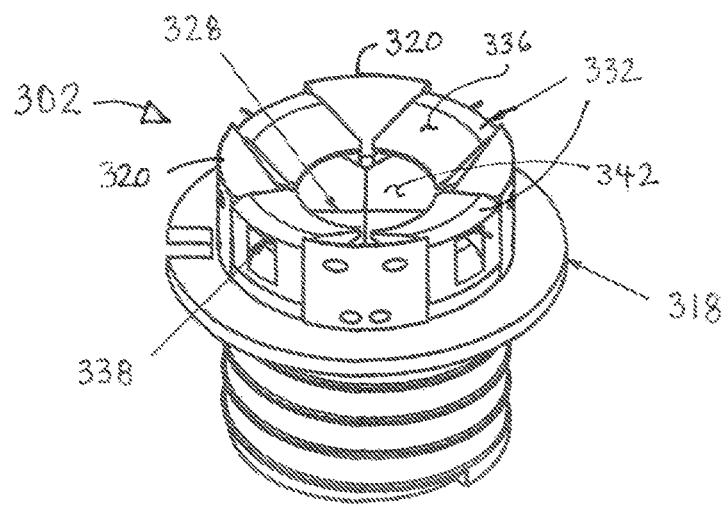
FIG. 9 is a perspective view that illustrates the body assembly with the closure mechanism and locking elements in a closed position.
Figure 10:
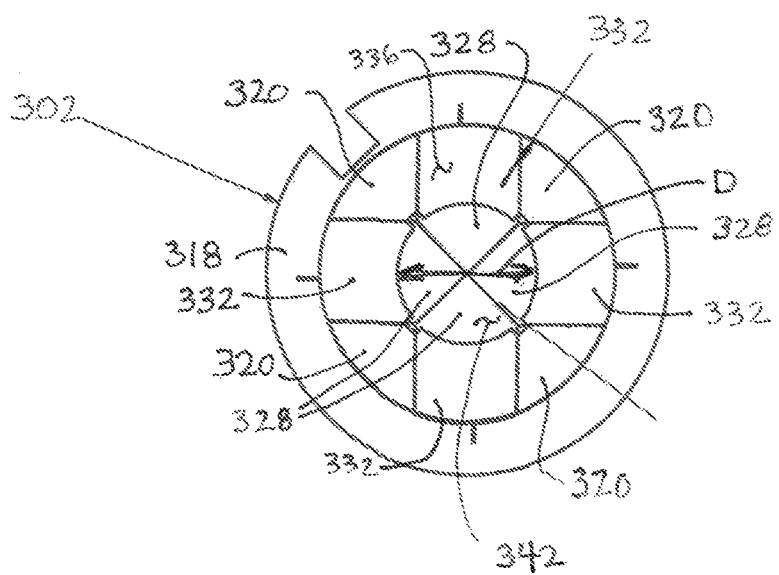
FIG. 10 is a top view of the body assembly of FIG. 9.

In the closed position shown in FIGS. 8-10, locking elements 332 form an opening having a diameter D (FIG.

Figure 12:
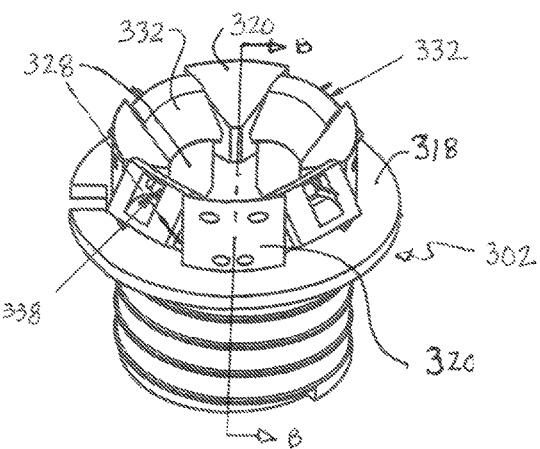
FIG. 12 is a perspective view that illustrates the body assembly with the closure mechanism and locking elements in an open position.
Figure 13:
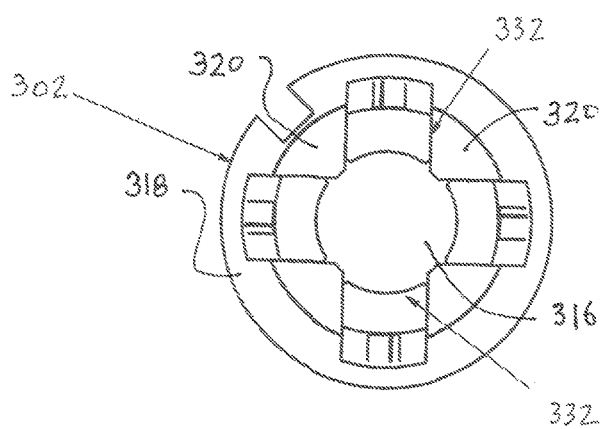
FIG. 13 is a top view of the body assembly of FIG. 12.

10) so that only nozzles of sufficient diameter larger than diameter D engage faces 336 of locking elements 332 to pivot them to release pivotal elements 328 from the locked position. Pivotal elements 328 extend radially inward further than locking elements 332 so that further insertion of the nozzle causes locking elements 332 to engage upper surfaces 342 of pivotal elements 328 to be pivoted to the open position to dispense fuel through body 302 and into the fuel container (FIG. 17). In the open position shown in FIGS. 11-13, locking elements 332 are shown pivoted a position in which lips 341 of locking elements 332 no longer abut flanges 340 of associated pivotal elements 328 and release them to be pivoted to a fully open position allowing access to through-opening 316

When the nozzle is withdrawn, springs 338 bias locking elements 332 back to the locking position in which lip 341 of each locking element 332 engages flange 340 of its associated pivotal element 328 to force pivotal elements 328 into the closed position and hold or lock them in the closed position.

However, a nozzle for an inappropriate fuel (i.e., smaller diameter nozzle for gasoline) having a diameter less than diameter D will pass through locking elements 332 without engaging faces 336 of locking elements 332. The nozzle will then abut upper surfaces 342 of pivotal elements 328 which are held closed by the abutting relationship between lip 341 of locking elements 332 and flange 340 of an associated pivotal element 328 to block access to the fuel inlet opening 316. Protrusions 320 form an opening slightly larger than diameter D so as not to block the nozzle and prevent insertion.

It is understood that pivotal elements 328 and locking elements 332 may be interchanged with pivotal elements and locking elements with dimensions that differ from that shown in the figures to accommodate nozzles of varying diameters.

Figure 15:
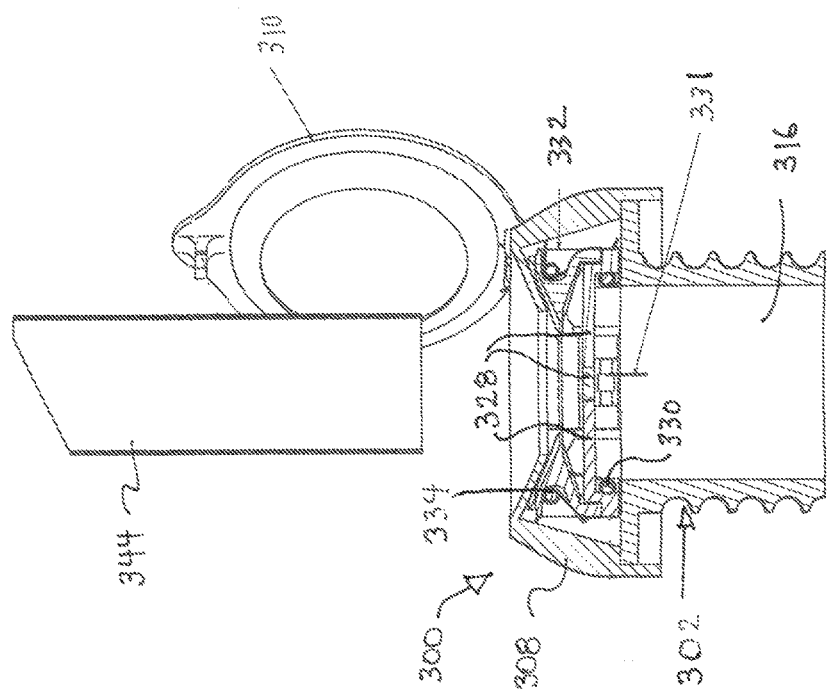
FIG. 15 is a sectional view taken along line C-C of FIG. 14.
Figure 14:
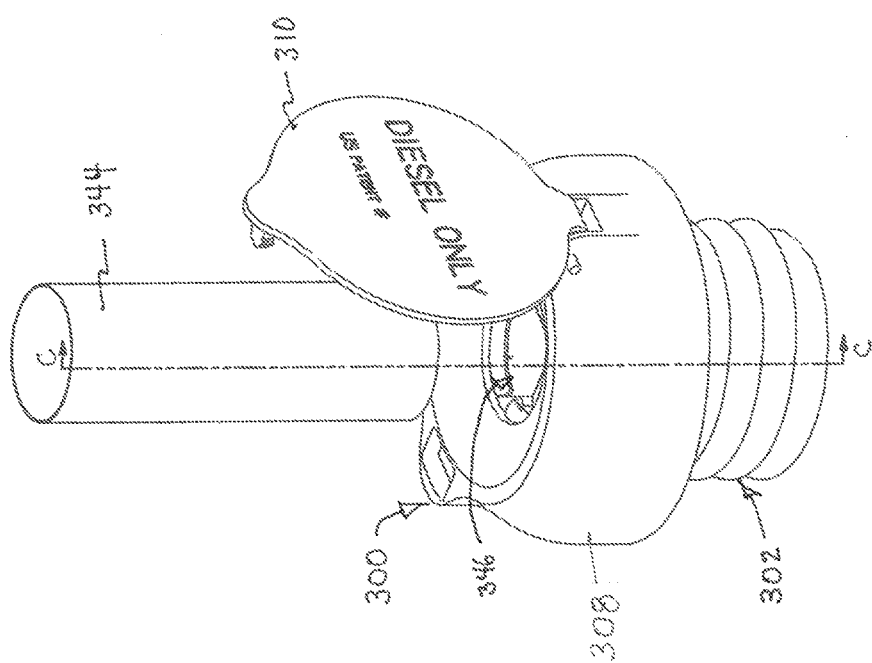
FIG. 14 is a perspective view of the fuel cap assembly before insertion of a nozzle.

FIGS. 14 and 15 show cap assembly 300 with a nozzle 344 positioned for insertion to dispense fuel. Nozzle guide 308 has an opening 346 to allow nozzle insertion substantially longitudinally to prevent nozzle 344 from being inserted at an angle and accidentally release pivotal elements 328. It can be clearly seen that locking elements 332 prevent pivotal elements 328 from pivoting should a nozzle of insufficient diameter be inserted to push against pivotal elements 328. FIGS. 16 and 17 show nozzle 344 fully inserted in opening 316 with pivotal elements 328 and locking elements 332 in the fully open position.

While the embodiments described are used to prevent introduction of gasoline into the tank of a diesel automobile, the invention is not limited to any particular type of tank or any particular type of liquid being pumped. For example, the invention may be incorporated into different types of tanker transport trucks, above ground and below ground fuel storage tanks, railroad tankers that transport fuel, and fuel storage tanks used to transport fuel on ships.

Figure 18:
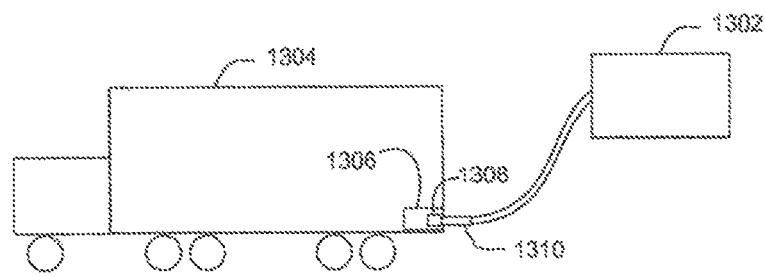
FIG. 18 shows a schematic view of an embodiment of the present invention used to prevent introduction of an incorrect fuel into a tanker truck.

In one example, FIG. 18 shows schematically the use of an embodiment of the invention to prevent the introduction of an incorrect fuel from a supply tank 1302 at a fuel storage facility into a tanker truck 1304. A fuel inlet 1306 on the truck includes an insert 1308 embodying the invention to prevent a nozzle 1310 from being inserted into a fuel truck if the fuel in tank 1302 is not the type of fuel intended to be introduced into fuel truck 1304. Of course, the type of nozzle 1310 at the storage facility will typically be of a different design from the nozzle at a retail gas station, so the design of the insert 1308 at the fuel inlet 1306 of the tanker truck 1304 will be modified accordingly.

Figure 19:
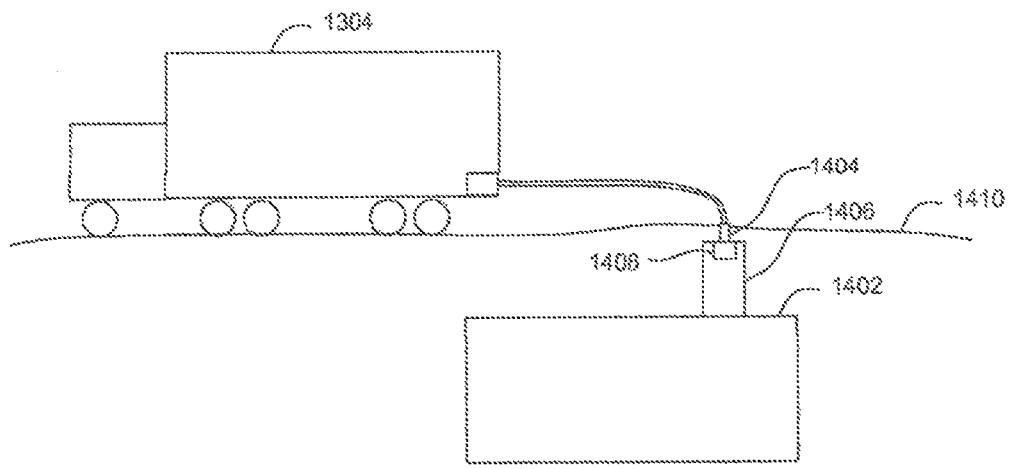
FIG. 19 shows schematic view of an embodiment of the present invention used to prevent introduction of an incorrect fuel into an underground gas tank.

In another example, FIG. 19 shows schematically the use of an embodiment of the invention to prevent the introduction of an incorrect fuel from a tanker truck 1304 into an underground or other storage tank 1402 at a gas station, commercial fueling station, agricultural fueling station, or heating oil storage. Tanker truck 1304 dispenses fuel through nozzle 1404 into an inlet 1406 of underground tank 1402. An insert 1408 in accordance with the present invention in the inlet 1406 prevents introduction of an incorrect fuel into the tank 1402. While tank 1402 is shown under ground level 1410, tank 1402 could also be above ground. Of course, the type of nozzle 1404 used by tanker will be different from the nozzle used to fill cars at a retail gas station, so the design of the insert 1408 at the filler inlet 1406 of the tank will be modified accordingly.

It can be seen from the following drawings that only a nozzle of sufficient diameter can push the locking segments into the release position and that a nozzle of smaller diameter would simply go through and past the locking mechanisms. Any attempt to insert a small diameter nozzle past the gate segments is prevented because they are blocked from pivoting to the open position by the locking segments. The invention is not limited to use in preventing incorrect fueling operation, but can be used whenever it is desirable to require a first part minimum size to be inserted into an opening in a second part.

Figure 20:
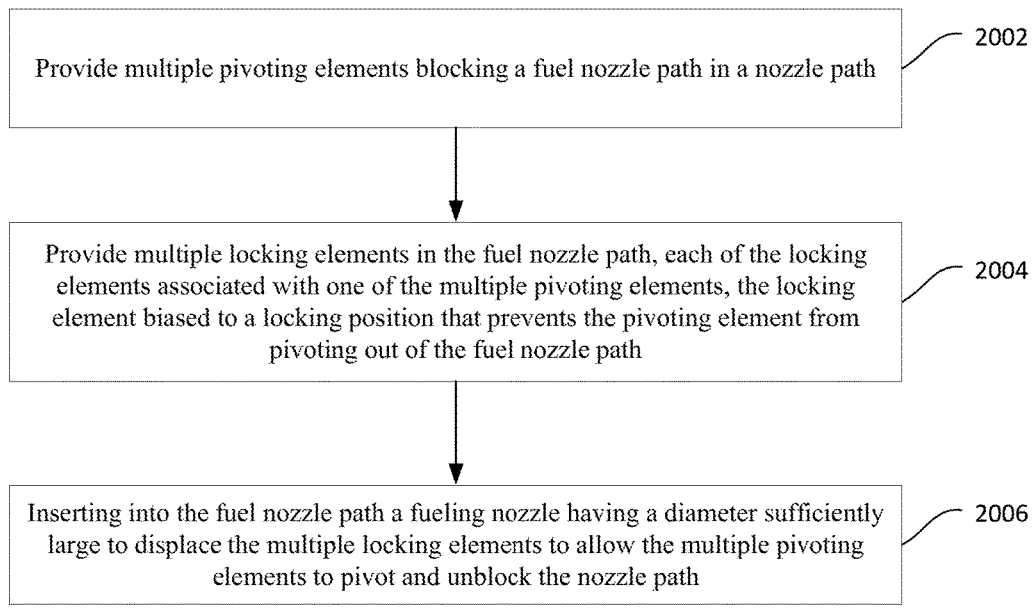
FIG. 20 is a flowchart showing a method of preventing improper fueling.

FIG. 20 is a flowchart showing steps for preventing improper fueling. In step 2002, entails providing multiple pivoting elements to blocking a fuel nozzle path in a nozzle path. Step 2004 entails providing multiple locking elements in the fuel nozzle path, each of the locking elements associated with one of the multiple pivoting elements, the locking element biased to a locking position that prevents the pivoting element from pivoting out of the fuel nozzle path. Step 2006 entails inserting into the fuel nozzle path a fueling nozzle having a diameter sufficiently large to displace the multiple locking elements to allow the multiple pivoting elements to pivot and unblock the nozzle path.

In some embodiments, inserting a fueling nozzle having a diameter sufficiently large to displace the multiple locking elements comprises inserting a fueling nozzle that pivots each of the multiple locking elements along a corresponding locking element pivot axis and pivots each of the multiple pivoting elements along a corresponding pivoting element pivot axis, the pivot axes for a corresponding pivot element and locking element being parallel to each other and displaced from each other along a fuel nozzle path.

Some embodiments provide an apparatus to prevent introduction of incorrect fuel into a fuel container, comprising:

a housing having a first end, a second end, a fluid inlet located at the first end, a fluid outlet located at the second end, and a flow path that extends through the housing from the fluid inlet to the fluid outlet;

a nozzle discriminating mechanism coupled to the housing, the nozzle discriminating mechanism comprising a plurality of pivotable elements mounted circumferentially about a perimeter of a first plane perpendicular to of the flow path and configured to pivot inside the flow path, wherein:

the nozzle discriminating mechanism is switchable between a locked state, in which the plurality of pivotable elements are locked into a configuration that obstructs the fluid inlet, and an unlocked state, in which the plurality of pivotable elements are capable of pivoting inside the flow path and toward the second end of the housing, and the nozzle discriminating mechanism is configured to switch from the locked state to the unlocked state when a nozzle having a first diameter is inserted into the fluid inlet port, and to remain in the locked state when a nozzle having a second diameter smaller than the first diameter is inserted into the fluid inlet port.

In some embodiments, the nozzle discriminating mechanism further comprises a plurality of locking elements disposed about a second perimeter of a second cross-section of the flow path, the second cross-section disposed upstream of and adjacent to the first cross-section;

switching of the nozzle discriminating mechanism from the unlocked state to the locked state comprises each of the locking elements interlocking with one of the pivotable elements such that each pivotable element cannot pivot and is locked into a fixed orientation relative to the housing; and when each of the pivotable elements has been locked into a fixed orientation, the pivotable elements collectively form a surface that obstructs the fluid inlet port.

In some embodiments, the pivotable elements and the locking elements extend radially inward, in a direction from the perimeter of the first cross-section towards the point where the longitudinal axis of the flow path intersects the first cross-section, when the pivotable elements are locked into the fixed orientation by the locking elements.

In some embodiments, the pivotable elements extend radially inward further than the locking elements.

In some embodiments, the locking elements and the pivotable elements are configured such that insertion of a nozzle having the first diameter into the fluid inlet up to a first insertion point along the flow path causes the locking elements to disengage the pivotable elements.

In some embodiments, the locking elements and the pivotable elements are configured such that insertion of a nozzle having the first diameter into the fluid inlet up to a second insertion point, the second insertion point being a location along the flow path that is further downstream than the first insertion point, causes a force to be exerted on each of the pivotable elements that causes the pivotable elements to pivot such that pivotable elements are oriented in a in a configuration that establishes a nozzle path between the fluid inlet and the fluid outlet.

In some embodiments, the apparatus is configured such that insertion of a nozzle having the first diameter into the fluid inlet port causes the nozzle having the first diameter to apply a force to upstream-facing surfaces of the locking elements in the downstream direction.

In some embodiments, the configuration that establishes a nozzle path between the fluid inlet and the fluid outlet comprises:

each of the pivotable elements being oriented in a direction parallel to an interior surface of the housing shared with the flow path, and a surface of each pivotable element facing downstream when the pivotable elements were arranged in the configuration that obstructs the fluid inlet is adjacent to and flush with the interior surface to which the pivotable element is parallel.

Some embodiments further comprise biasing elements configured to bias the pivotable elements, the locking elements, or the pivotable elements and the locking elements in favor of the configuration that obstructs the fluid inlet port such that removal of a nozzle having the first diameter from the fluid inlet port causes the nozzle discriminating mechanism to switch to the unlocked state to the locked state.

In some embodiments, the biasing elements comprise springs.

Some embodiments further comprise a screw threaded outer circumferential surface of the second end, the screw threading configured such that the second end can be rotated into the inlet of the fuel container and fixedly engaged with a complementary screw threaded inner circumferential surface of the inlet of the fuel vessel.

Some embodiments further comprise a screw threaded inner circumferential surface of the second end, the screw threading configured such that the second end can be rotated onto and around a screw threaded outer circumferential surface of the inlet of the fuel vessel to fixedly engage the second end with the inlet of the fuel vessel.

In some embodiments, the first diameter is a standard diameter for first nozzles designed to supply a first type of fuel to a fuel vessel.

In some embodiments, the second diameter is a standard diameter of second nozzles designed to supply a second type of fuel to a fuel vessel.

In some embodiments, the first nozzles are nozzles designed to deliver the first type of fuel to fuel tanks of automobiles compatible with the first type of fuel, and the second nozzles are nozzles designed to deliver the second type of fuel to fuel tanks of automobiles compatible with the second type of fuel.

In some embodiments, the first type of fuel is diesel fuel, and the second type of fuel is gasoline.

In some embodiments, components of the fuel cap comprise materials that are chemically resistant to the first type of fuel and the second type of fuel.

In some embodiments:

the pivotable elements are first pivotable elements, and the locking elements are first locking elements;

the first pivotable elements and the first locking elements are interchangeable with second pivotable elements and second locking elements; and dimensions of the second pivotable elements and the second locking elements are such that, if the second pivotable elements and the second locking elements are interchanged with the first pivotable elements and the first locking elements, the nozzle discriminating mechanism will switch from the locked state to the unlocked state when a nozzle having a third diameter different from the first diameter is inserted into the fluid inlet, and to remain in the locked state when a nozzle having a fourth diameter that is smaller than the third diameter is inserted into the fluid inlet.

In some embodiments, the third diameter is a standard diameter for third nozzles designed to supply a third type of fuel to a fuel vessels designed to hold the third type of fuel, and further comprising a sleeve coupling adapted to:

connect the second end of the housing to an inlet that is incompatible with coupling directly to the second end and that provides access to an interior chamber of a fuel vessel designed to hold the third type of fuel; and establish fluid communication between a third nozzle inserted into the fluid inlet port, the flow path of the housing, and the interior chamber of the fuel vessel designed to hold the third type of fuel.

In some embodiments, the inlet is a filler neck and the fuel vessel is a diesel fuel container.

Some embodiments provide a cap assembly for attachment to a filler neck of a fuel container, comprising:

a body having a longitudinal axis with a through-hole extending from one end of the body to a second end of the body for access to an interior of the fuel container;

multiple radially inward extending pivotable elements disposed about a periphery of the through-hole, each pivotable element being pivotally mounted about an axis perpendicular to the longitudinal axis of the body to block access to the interior of the fuel container in a closed position and to allow access to the interior of the fuel container in an open position; and a displaceable locking member associated with each pivotable element and located about the periphery of the through-hole, each locking member positioned adjacent an associated pivotable element on a side toward a first end of the body, each locking member extending radially inward and pivotable about an axis perpendicular to the longitudinal axis of the body to be movable between a locked configuration that prevents the pivotable element from pivoting to the open position and an unlocked configuration that allows the pivotable element to pivot to the open position for access to the interior of the fuel container.

In some embodiments, the axis about which each pivotable element rotates is longitudinally spaced from the axis about which its associated locking member rotates.

In some embodiments, each locking member is spring biased into an abutting relationship with its associated pivotable element in the locked configuration.

In some embodiments, each pivotable element comprises a flange that extends radially outward in a direction away from the longitudinal axis, and each locking member includes a lip positioned in an abutting relationship with the flange of the pivotable element in the locked configuration and positioned in a non-abutting relationship with the radially outward flange of its associated pivotable element in the unlocked configuration.

In some embodiments, each locking member includes a surface for engagement with a nozzle of sufficient diameter to move each locking member to the unlocked configuration to release its associated pivotable element to be movable into the open position and allow the nozzle to be inserted into the through-hole.

Some embodiments provide an apparatus for preventing a first type of fuel from entering a vessel containing a second type of fuel, comprising:

a body having an upstream end, a downstream end, and a through-hole that passes through the body along a longitudinal axis from an opening in the body at the upstream end to an opening in the body at the downstream end;

a plurality of pivotable elements disposed about and pivotally connected to an upstream portion of the body that defines an outer boundary of the through-hole, the plurality of pivotable elements configurable in an open configuration and a closed configuration, wherein:

the closed configuration comprises each of the pivotable elements being extended radially inward toward the longitudinal axis such that the pivotable elements collectively form a surface across the through-hole that blocks the through-hole;

each pivotable element is pivotally connected to the body about an axis perpendicular to the longitudinal axis of the body and switching from the closed configuration to the open configuration comprises each of the pivotable elements pivoting away from the longitudinal axis in a direction that causes unblocking of the through-hole; and a displaceable locking member associated with each pivotable element, the displaceable locking member supported by a portion of the body that is adjacent to and upstream of the associated pivotable element, wherein:

each displaceable locking member extends radially inward toward the longitudinal axis when the plurality of pivotable elements are in the closed configuration and locks the orientation of the adjacent pivotable element such that the plurality of pivotable elements continuously maintain the closed configuration that causes blocking of the through-hole, each displaceable locking member is movable about an axis that is tangent to the portion of the body that supports the displaceable locking member and that lies in the plane of a cross-section of the through-hole that is normal to the longitudinal axis, and movement of the displaceable locking member unlocks the associated pivotable element and enables the pivotable element to pivot to the open position.

In some embodiments, the axis about which each pivotable element rotates is longitudinally spaced from the axis about which its associated displaceable locking member rotates.

In some embodiments, each displaceable locking member is spring biased into an abutting relationship with its associated pivoting member in the locked orientation.

In some embodiments:

each pivotable element comprises a radially outward flange;

each displaceable locking member comprises a lip;

abutment of the radially outward flange of each pivotable element by the lip of the associated displaceable locking member locks the orientation of the pivotable element; and moving the lip of each displaceable locking member out of an abutting relationship with the associated pivotable member unlocks the orientation of the pivotable element.

In some embodiments, the diesel fuel container is a fuel tank of a vehicle, a fuel storage container, or a tanker vehicle.

In some embodiments, each displaceable locking member includes a surface configured to engage a nozzle of sufficient diameter to move each displaceable locking member to the unlocked configuration to release its associated pivotable element to be movable into the open position and allow the nozzle to be inserted into the through-hole.

Some embodiments provide an apparatus for a filler neck of a diesel fuel container to prevent gasoline from entering the diesel fuel container, comprising:

a body having a longitudinal axis with a through-hole for access to an interior of the diesel fuel container;

at least one closure element extending radially inwardly to block access to the through-hole in a closed position, the closure element pivotally connected to the body about an axis perpendicular to the longitudinal axis of the body to pivot to allow access to the through hole in an open position; and at least one displaceable locking member associated with the closure element to lock the closure element in the closed position, and pivotally connected to the body about an axis perpendicular to the longitudinal axis of the body to allow the closure element to pivot to the open position.

Some embodiments provide an apparatus for preventing incorrect fueling operations, comprising:

a housing defining a nozzle path;

a set of pivoting elements, each of the pivoting elements having a pivoting element pivot pin positioned along the periphery of the nozzle path, the pivoting allowing the pivoting element to pivot out of the nozzle path; and a set of locking elements, each of the locking elements associated with one of the pivoting elements, the locking elements each having a locking element pivot pin and extending sufficiently into the nozzle path so that a nozzle of a sufficiently large diameter inserted into the nozzle path will displace all of the locking elements in the set, allowing the pivoting elements to pivot to pass the nozzle.

Some embodiments further comprise a set of biasing elements, each of the biasing elements associated with one of the locking elements and maintaining the associated locking element in a position to prevent the pivoting element from pivoting out of the nozzle path unless each of the locking elements is displaced by a nozzle of sufficiently large diameter.

In some embodiments, all of the locking element pivot pins are in a first plane and all the of the pivoting element pivot pins are in a second plane.

Although the present invention and its advantages have been described in detail, it should be understood that various changes, substitutions and alterations can be made to the embodiments described herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. An apparatus for preventing a first type of fuel from entering a vessel containing a second type of fuel, comprising:
  a body having an upstream end, a downstream end, and a through-hole that passes through the body along a longitudinal axis from an opening in the body at the upstream end to an opening in the body at the downstream end;
  a plurality of pivotable elements disposed about and pivotally connected to an upstream portion of the body that defines an outer boundary of the through-hole, the plurality of pivotable elements configurable in an open configuration and a closed configuration, wherein:
    the closed configuration comprises each of the pivotable elements being extended radially inward toward the longitudinal axis such that the pivotable elements collectively form a surface across the through-hole that blocks the through-hole;
    each pivotable element is pivotally connected to the body about an axis perpendicular to the longitudinal axis of the body and switching from the closed configuration to the open configuration comprises each of the pivotable elements pivoting away from the longitudinal axis in a direction that causes unblocking of the through-hole; and
  a displaceable locking member associated with each pivotable element, the displaceable locking member supported by a portion of the body that is adjacent to and upstream of the associated pivotable element, wherein:
    each displaceable locking member extends radially inward toward the longitudinal axis when the plurality of pivotable elements are in the closed configuration and locks the orientation of the adjacent pivotable element such that the plurality of pivotable elements continuously maintain the closed configuration that causes blocking of the through-hole,
    each displaceable locking member is movable about an axis that is tangent to a circle drawn within the plane of the axes and having a center point on the longitudinal axis, such that each axis of a pivoting displaceable member is tangent to the same circle and lies in the plane of a cross-section of the through-hole that is normal to the longitudinal axis, and
    movement of the displaceable locking member unlocks the associated pivotable element and enables the pivotable element to pivot to the open position.

2. The apparatus of claim 1, wherein the axis about which each pivotable element rotates is longitudinally spaced from the axis about which its associated displaceable locking member rotates.

3. The apparatus of claim 2, wherein each displaceable locking member is spring biased into an abutting relationship with its associated pivoting member in the locked orientation.

4. The apparatus of claim 1, wherein:
  each pivotable element comprises a radially outward flange;
  each displaceable locking member comprises a lip;
  abutment of the radially outward flange of each pivotable element by the lip of the associated displaceable locking member locks the orientation of the pivotable element; and
  moving the lip of each displaceable locking member out of an abutting relationship with the associated pivotable member unlocks the orientation of the pivotable element.

5. The apparatus of claim 1, wherein the diesel fuel container is a fuel tank of a vehicle, a fuel storage container, or a tanker vehicle.

6. The apparatus of claim 1, wherein each displaceable locking member includes a surface configured to engage a nozzle of sufficient diameter to move each displaceable locking member to the unlocked configuration to release its associated pivotable element to be movable into the open position and allow the nozzle to be inserted into the through-hole.

* * * * *